(12) United States Patent
Mutter et al.

(10) Patent No.: US 11,989,151 B2
(45) Date of Patent: May 21, 2024

(54) TRANSCEIVER DEVICE AND COMMUNICATION CONTROL DEVICE FOR A USER STATION OF A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 15 days.

(21) Appl. No.: 17/792,186

(22) PCT Filed: Jan. 18, 2021

(86) PCT No.: PCT/EP2021/050943
§ 371 (c)(1),
(2) Date: Jul. 12, 2022

(87) PCT Pub. No.: WO2021/148351
PCT Pub. Date: Jul. 29, 2021

(65) Prior Publication Data
US 2023/0049285 A1 Feb. 16, 2023

(30) Foreign Application Priority Data
Jan. 23, 2020 (DE) ..................... 10 2020 200 804.3

(51) Int. Cl.
*G06F 13/42* (2006.01)
*G06F 13/40* (2006.01)
(52) U.S. Cl.
CPC ...... *G06F 13/4282* (2013.01); *G06F 13/4022* (2013.01)

(58) Field of Classification Search
CPC .......................... G06F 13/4282; G06F 13/4022
See application file for complete search history.

(56) References Cited

U.S. PATENT DOCUMENTS

2014/0365693 A1  12/2014  Monroe et al.
2016/0098373 A1*  4/2016  Patton, Jr. ................ H04L 5/16
                                                              710/106
(Continued)

FOREIGN PATENT DOCUMENTS

| DE | 102008033588 A1 | 1/2010 |
| DE | 102018203705 A1 | 9/2019 |
| EP | 2339778 A1 | 6/2011 |

OTHER PUBLICATIONS

International Search Report for PCT/EP2021/050943, dated Apr. 20, 2021.
(Continued)

*Primary Examiner* — Henry Tsai
*Assistant Examiner* — John B Roche
(74) *Attorney, Agent, or Firm* — NORTON ROSE FULBRIGHT US LLP; Gerard A. Messina

(57) ABSTRACT

A transceiver device, communication control device, and method for a user station of a serial bus system. The transceiver device includes a first terminal for receiving a transmission signal from a communication control device, a transmission module for transmitting the transmission signal onto a bus, a reception module for receiving the signal from the bus, the reception module configured to generate a digital reception signal from the signal received from the bus, a second terminal for sending the digital reception signal to the communication control device and for receiving an operating mode changeover signal from the communication control device, and a changeover feedback block for outputting feedback regarding a changeover of the operating mode that has taken place based on the operating mode
(Continued)

changeover signal. The changeover feedback block is configured to output the feedback to the communication control device via the second terminal and in the digital reception signal.

16 Claims, 5 Drawing Sheets

(56) References Cited

U.S. PATENT DOCUMENTS

| | | | |
|---|---|---|---|
| 2016/0378702 A1* | 12/2016 | Caruk | H04L 5/0055 |
| | | | 710/106 |
| 2017/0235694 A1* | 8/2017 | Lee | G09G 5/006 |
| | | | 710/106 |
| 2019/0146944 A1* | 5/2019 | Pitigoi-Aron | G06F 13/4291 |
| | | | 710/301 |

OTHER PUBLICATIONS

ISO 11898-1:2015 Standard, "Road Vehicles—Controller Area Network (CAN)—Part 1: Data Link Layer and Physical Signalling," 2015, pp. 1-74.

* cited by examiner

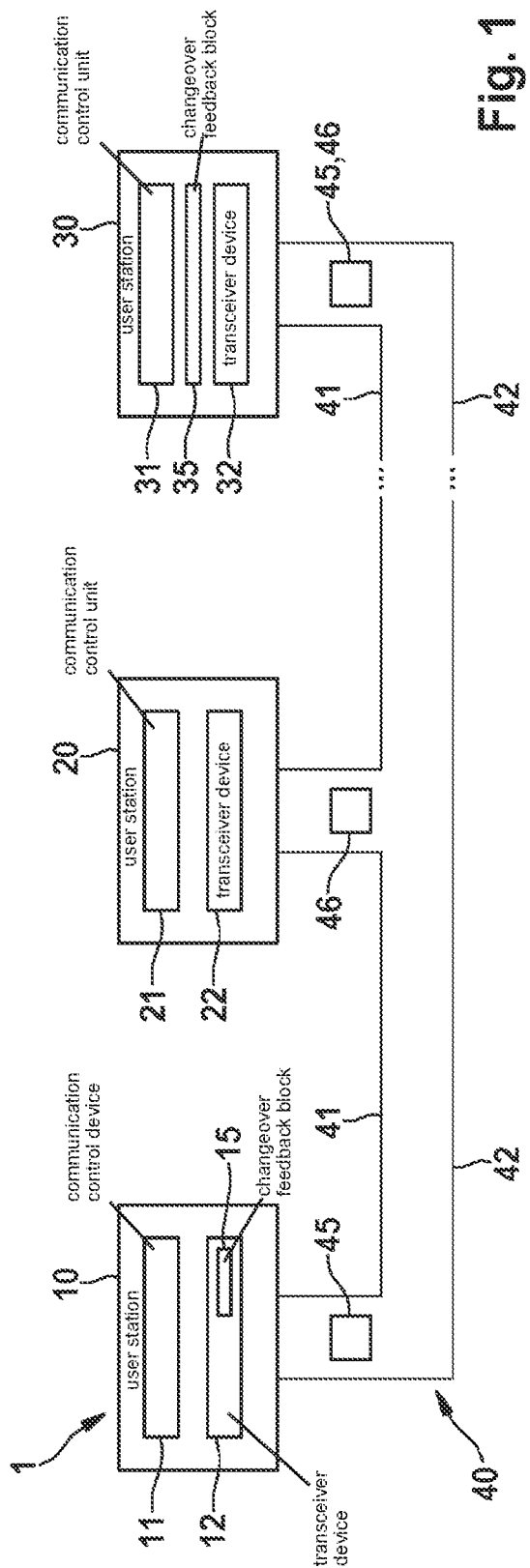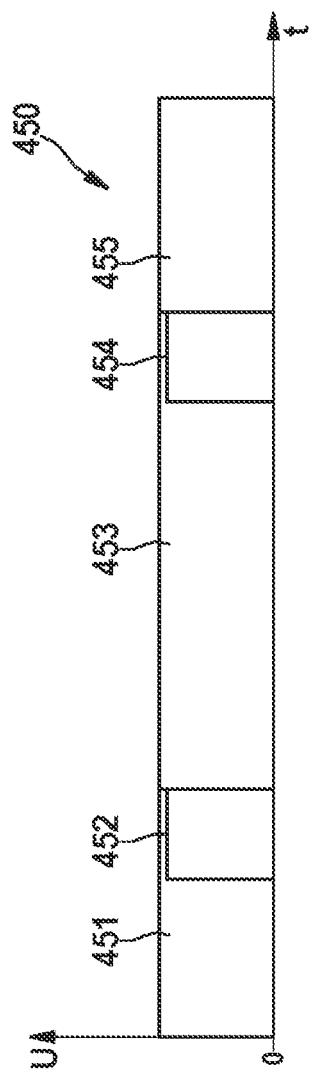

TRANSCEIVER DEVICE AND COMMUNICATION CONTROL DEVICE FOR A USER STATION OF A SERIAL BUS SYSTEM, AND METHOD FOR COMMUNICATING IN A SERIAL BUS SYSTEM

FIELD

The present invention relates to a transceiver device and a communication control device for a user station of a serial bus system, and a method for communicating in a serial bus system that operates with a high data rate and a high level of error robustness.

BACKGROUND INFORMATION

For the communication between sensors and control units, for example in vehicles, a bus system is frequently used in which data are transferred as messages under the ISO 11898-1:2015 standard, as a CAN protocol specification with CAN FD. The messages are transferred as analog signals between the bus users of the bus system, such as the sensor, control unit, transducer, etc.

Each bus user of the bus system is connected to the bus using a transceiver device. At least one reception comparator is provided in the transceiver device which receives the analog signals from the bus and converts them into a digital signal. The content of the digital signal may be interpreted by a communication control device with the aid of its protocol controller. In addition, the communication control device may create a signal for the transfer on the bus and send it onto the bus, using the transceiver device. In this way, pieces of information are exchangeable between the bus users.

To allow data to be transferred at a higher bit rate via the bus than with CAN, an option has been provided in the CAN FD message format and in the CAN XL message format for changing over to a higher bit rate within a message. In such technologies, the maximum possible data rate is increased in comparison to CAN by using higher clocking in the area of the data fields. For CAN FD frames or CAN FD messages, the maximum possible data rate is increased beyond a value of 1 Mbit/s. In addition, the useful data length is expanded from 8 bytes to up to 64 bytes. The same applies for CAN XL, in which the speed of the data transfer is to be increased into the range of 10BASE-T1S Ethernet, for example, and the useful data length of up to 64 bytes thus far achieved with CAN FD is intended to be greater. The robustness of the CAN- or CAN FD-based communications network may thus be advantageously maintained.

For the transfer at the higher bit rate, the previous operating mode of the transceiver device is to be changed over from an operating mode for the transfer at the lower bit rate (operating mode Z_SL) into another operating mode. It should be noted that during the transfer at the higher bit rate, only one of the user stations of the bus system is the sender of the message, whereas all other user stations are only receivers of the message. Therefore, for the signaling of operating mode Z_F, for the higher bit rate a distinction is made as to whether the user station is only the receiver (operating mode Z_F_RX) or also the sender (operating mode Z_F_TX) in order to appropriately switch the operating mode of its transceiver device.

It is possible for the communication control device to signal to the transceiver device the information concerning which operating mode the transceiver device is to be switched into. As a result, however, it is not known to the communication control device whether the transceiver device even notices the signaling of the changeover of the operating mode at all, and whether the transceiver device correctly interprets or implements the signaling of the changeover of the operating mode.

SUMMARY

An object of the present invention is to provide a transceiver device and a communication control device for a user station of a serial bus system, and a method for communicating in a serial bus system, which solve the above-mentioned problems. In particular, an object is to provide a transceiver device and a communication control device for a user station of a serial bus system, and a method for communicating in a serial bus system in which the changeover of the operating mode of the transceiver device may be carried out with high robustness, and also that the carrying out is checkable with little expenditure of time and costs.

The object may be achieved by a transceiver device for a user station of a serial bus system in accordance with the present invention. In accordance with an example embodiment of the present invention, the transceiver device includes a first terminal for receiving a transmission signal from a communication control device, a transmission module for transmitting the transmission signal onto a bus of the bus system, in which bus system at least one first communication phase and one second communication phase are used for exchanging messages between user stations of the bus system, a reception module for receiving the signal from the bus, the reception module being designed to generate a digital reception signal from the signal received from the bus, a second terminal for sending the digital reception signal to the communication control device and for receiving an operating mode changeover signal from the communication control device, and a changeover feedback block for outputting feedback regarding a changeover of the operating mode that has taken place as a result of the operating mode changeover signal, the changeover feedback block being designed to output the feedback to the communication control device via the second terminal and in the digital reception signal.

In the reception signal, the transceiver device may provide feedback to the communication control device, via the second terminal that is already present, as to whether the transceiver device has noticed the signaling of the changeover of the operating mode, and how the signaling has been interpreted. On this basis, the communication control device may check whether or not the transceiver device is correctly switched for the present operating state or the present communication phase. The changeover of the operating mode of the transceiver device is thus checkable, which increases the robustness of the bus system. The reason is that in the event of an error, the communication control device may respond in a targeted manner since it is aware of the problem.

Furthermore, an additional terminal or a protocol controller for the transceiver device is not necessary. All of this saves significant silicon surface area, and thus saves on resources, space, and costs.

The feedback of the changeover of the operating mode to the communication control device also makes it possible for the communication control device to respond appropriately in the event of error. For example, the communication control device may send an error frame in order to abort the transfer of the frame. The transfer using incorrectly set bus components may thus be discontinued as quickly as possible. This increases the net data rate that is transferable in the bus system, and the communication in the bus system becomes more robust.

In accordance with an example embodiment of the present invention, the feedback of the changeover of the operating mode to the communication control device assists with troubleshooting, since the communication control device knows whether the transceiver device was able to change the state. The communication control device may also indicate via software that the connected communication control device already has not been able to carry out the changeover K times, where K is a natural number including 0. The value of K may be seen as an indication of how soon the transceiver device might fail. To prevent the failure, the transceiver device may then be replaced in a timely manner in a repair shop prior to the failure. This increases the safety of the system in which the bus system is used.

In addition, by use of the transceiver device, in one of the communication phases, an arbitration from CAN may be maintained while still increasing the transfer rate considerably compared to CAN or CAN FD. This may be achieved by using two communication phases having different bit rates, and making the start of the second communication phase, in which the useful data are transferred at a higher bit rate than in the arbitration, clearly identifiable and checking them for the transceiver device. As a result, a substantial increase in the bit rate, and thus in the transfer speed from the sender to the receiver, is achievable. However, at the same time a high level of error robustness is ensured.

In accordance with an example embodiment of the present invention, the method carried out by the transceiver device may also be used when at least one CAN user station and/or at least one CAN FD user station that send(s) messages according to the CAN protocol and/or CAN FD protocol are/is also present in the bus system.

Advantageous further embodiments of the transceiver device are disclosed herein.

In accordance with an example embodiment of the present invention, the changeover feedback block may include an operating mode detection module for detecting, based on the output signals of the transmission module and of the reception module, which operating mode the transmission module and the reception module are switched into, and an operating mode feedback module for evaluating an operating mode status signal that is output by the operating mode detection module, using a status signal of an operating mode changeover block that is designed to carry out the changeover of the operating mode based on the operating mode changeover signal.

The operating mode feedback module may be designed to decide whether the operating mode feedback module must provide feedback to the communication control device via the digital reception signal, and when the feedback must be sent.

According to one particular embodiment of the present invention, the operating mode feedback module may be designed to insert the feedback into the digital reception signal after the changeover of the operating mode that has been signaled via the operating mode changeover signal.

According to another particular embodiment of the present invention, the operating mode feedback module may be designed to insert the feedback into the digital reception signal after the operating mode changeover signal but before the changeover of the operating mode that has been signaled via the operating mode changeover signal.

It is possible for the operating mode feedback module to be designed to insert the feedback into the digital reception signal as at least one pulse having a value that is the inverse of a value of the digital reception signal. The pulse may have a predetermined absolute duration. Alternatively, the pulse is designed in such a way that the pulse in the digital reception signal overwrites a value whose duration in the digital reception signal is limited by the distance between two arbitrary edges in the digital reception signal.

The at least one pulse may last at the bus up to a subsequent edge change that follows in the digital reception signal.

Alternatively, it is possible for the operating mode feedback module to be designed to configure the feedback as manipulation of the digital reception signal in such a way that the digital reception signal has a constant value up to a predetermined event. The predetermined event may be a new signaling of the changeover of the operating mode, using the operating mode changeover signal, or a predetermined passage of time in the transceiver device.

The transceiver device may also include an operating mode changeover block for evaluating the operating mode changeover signal that is received from the communication control device at the second terminal and for evaluating the transmission signal, the operating mode changeover block being designed to switch the transmission module and/or the reception module into one of at least three different operating modes based on a result of the evaluation.

The operating mode changeover signal received from the communication control device at the second terminal is possibly at least one pulse having a value that is the inverse of a value of the digital reception signal, the operating mode changeover block being designed to switch the reception module from the first operating mode into the second operating mode when the changeover signal includes the pulse, and the value of the transmission signal corresponds to the value of the pulse, the operating mode changeover block being designed to switch the transmission module and the reception module from the first operating mode into the third operating mode when the changeover signal includes the pulse, and the value of the transmission signal is the inverse of the value of the pulse. It is possible for the transceiver device in the second operating mode to not be the sender of the message in the second communication phase, and for the transceiver device in the third operating mode to be the sender of the message in the second communication phase.

Moreover, the object stated above may be achieved by a communication control device for a user station of a serial bus system having the features of the present invention. In accordance with an example embodiment of the present invention, the communication control device includes a communication control module for generating a transmission signal for controlling a communication of the user station with at least one other user station of the bus system, in which bus system at least one first communication phase and one second communication phase are used for exchanging messages between user stations of the bus system, a first terminal for sending the transmission signal to a transceiver device which is designed to transmit the transmission signal onto a bus of the bus system, a second terminal for receiving a digital reception signal from the transceiver device, the communication control device being designed to generate an additional signal that indicates to the transceiver device that a switch is to be made from the present operating mode into another operating mode of at least two different operating modes, and that achieves an internal communication between the communication control module and the transceiver device, and the communication control module being designed to send the additional signal, in the digital reception signal, to the transceiver device via the second terminal, and to receive, via the second terminal, feedback in the digital reception signal from the transceiver device regarding a changeover of the operating mode that has taken place as a result of the operating mode changeover signal, and to evaluate the feedback.

The communication control device yields the same advantages as stated above with regard to the transceiver device.

In accordance with an example embodiment of the present invention, the transmission module is possibly designed to drive bits of the signals onto the bus in the first communication phase with a first bit time that is longer by at least a factor of 10 than a second bit time of bits that are driven by the transmission module onto the bus in the second communication phase. The operating mode changeover signal, via the second terminal for signaling that the changeover of the operating mode is to be made, may include at least one pulse with a duration that is shorter than the first bit time and longer than the second bit time, or at least one pulse with a pulse duration that is approximately equal to the second bit time or shorter than the second bit time. In addition, the feedback via the second terminal for signaling that the operating mode has been changed over may include at least one pulse with a duration that is shorter than the first bit time and longer than the second bit time, or at least one pulse with a pulse duration that is approximately equal to the second bit time or shorter than the second bit time.

According to one option, the signal received from the bus in the first communication phase is generated with a different physical layer than the signal received from the bus in the second communication phase.

It is possible that in the first communication phase, it is negotiated which of the user stations of the bus system in the subsequent second communication phase obtains, at least temporarily, exclusive, collision-free access to the bus.

The above-described transceiver device and the above-described communication control device may be part of a user station of a bus system which also includes a bus and at least two user stations that are connected to one another via the bus in such a way that they may communicate serially with one another. At least one of the at least two user stations includes an above-described transceiver device and an above-described communication control device.

Moreover, the object stated above may be achieved by a method for communicating in a serial bus system according to the present invention. In accordance with an example embodiment of the present invention, the method is carried out using a transceiver device of a user station for a bus system in which at least one first communication phase and one second communication phase are used for exchanging messages between user stations of the bus system, the user station including a transmission module, a reception module, a changeover feedback block, a first terminal, and a second terminal, and the method including the steps of receiving, via the reception module, a signal from the bus of the bus system, generating, via the reception module, a digital reception signal from the signal received from the bus and outputting the digital reception signal to the second terminal, outputting, via the changeover feedback block, feedback regarding a changeover of the operating mode that has taken place based on the operating mode changeover signal, the changeover feedback block outputting the feedback to the communication control device via the second terminal and in the digital reception signal.

The method yields the same advantages as stated above with regard to the transceiver device and/or the communication control device.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

FIG. 1 shows a simplified block diagram of a bus system according to a first exemplary embodiment of the present invention.

FIG. 2 shows a diagram for illustrating the design of messages that may be sent from user stations of the bus system according to the first exemplary embodiment of the present invention.

Unless stated otherwise, identical or functionally equivalent elements are provided with the same reference numerals in the figures.

DETAILED DESCRIPTION OF EXAMPLE EMBODIMENTS

Figure 3:
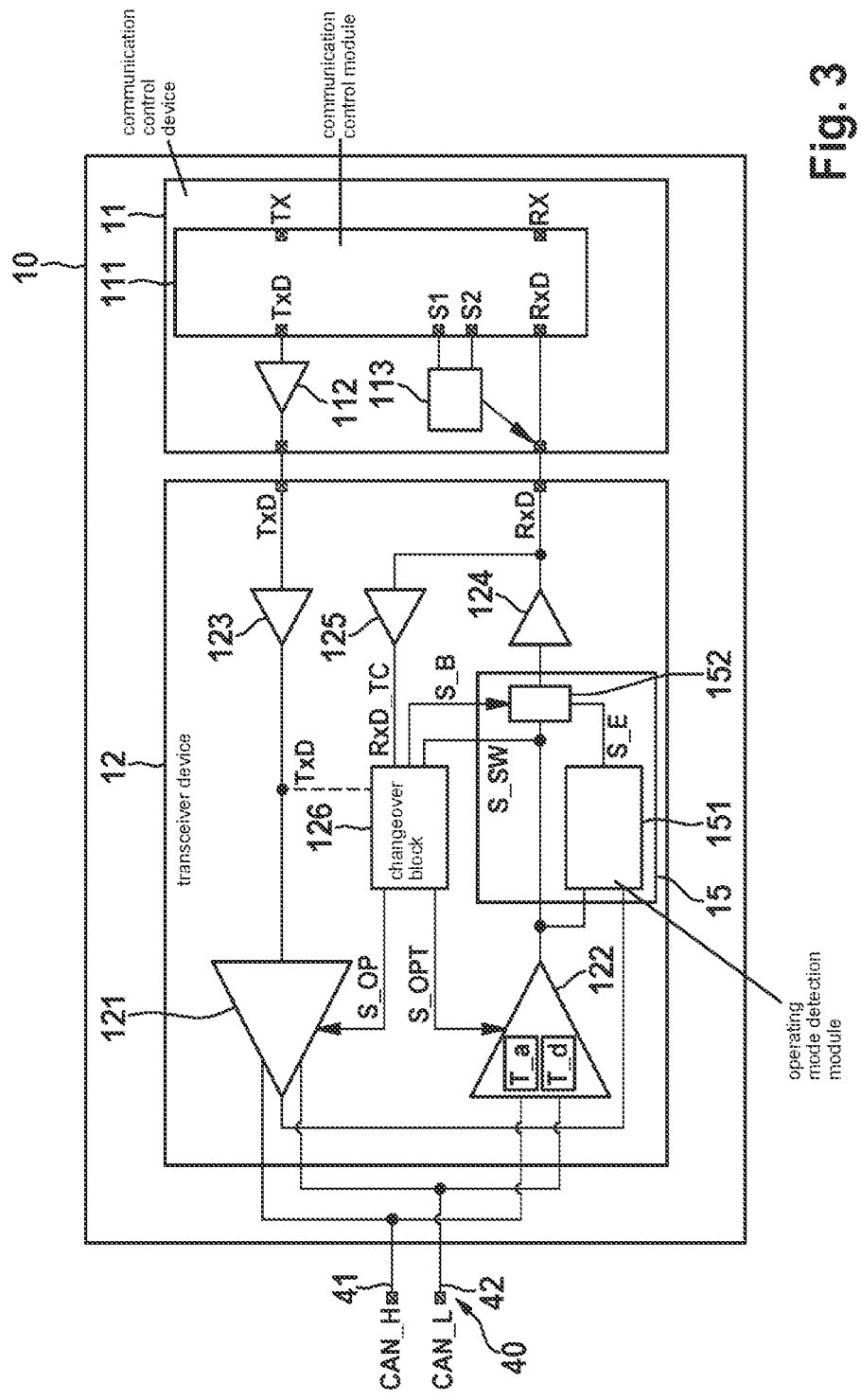
FIG. 3 shows a simplified schematic block diagram of a user station of the bus system according to the first exemplary embodiment of the present invention.

FIG. 1 shows as an example a bus system 1 that is in particular the basis for the design of a CAN bus system, a CAN FD bus system, a CAN FD successor bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L, and are used for electrical signal transfer after coupling-in the dominant levels or generating recessive levels for a signal in the transmission state. Messages 45, 46 in the form of signals are serially transferable between individual user stations 10, 20, 30 via bus 40. User stations 10, 20, 30 are, for example, control units, sensors, display devices, etc., of a motor vehicle.

As shown in FIG. 1, user station 10 includes a communication control device 11, a transceiver device 12, and a changeover feedback block 15. In contrast, user station 20 includes a communication control device 21 and a transceiver device 22. User station 30 includes a communication control device 31, a transceiver device 32, and a changeover feedback block 35. Transceiver devices 12, 22, 32 of user stations 10, 20, 30 are each directly connected to bus 40, although this is not illustrated in FIG. 1.

In each user station 10, 20, 30, messages 45, 46 are encoded in the form of frames via a TXD line and an RXD line, and are exchanged bitwise between particular communication control device 11, 21, 31 and associated transceiver device 12, 22, 32. This is described in greater detail below.

Communication control devices 11, 21, 31 are each used for controlling a communication of particular user station 10, 20, 30 via bus 40 with at least one other user station of user stations 10, 20, 30 connected to bus 40.

Communication control devices 11, 31 create and read first messages 45, which are modified CAN messages 45, for example, and also referred to below as CAN XL messages 45. Modified CAN messages 45 or CAN XL messages 45 are built up based on a CAN FD successor format, described in greater detail with reference to FIG. 2. Communication control devices 11, 31 may also be designed to provide a CAN XL message 45 or a CAN FD message 46 for transceiver devices 12, 32 or receive it from same, as needed. Communication control devices 11, 31 thus create and read a first message 45 or second message 46, first and second messages 45, 46 differing by their data transfer standard, namely, CAN XL or CAN FD in this case.

Communication control device 21 may be designed as a conventional CAN protocol controller or CAN controller according to ISO 11898-1:2015, in particular as a CAN FD-tolerant conventional CAN controller or a CAN FD controller. Communication control device 21 creates and reads second messages 46, for example conventional CAN messages or CAN FD messages 46. CAN FD messages 46 may include a number from 0 to up to 64 data bytes, which in addition are transferred at a much faster data rate than that of a conventional CAN message. In the latter case, communication control device 21 is designed as a conventional CAN FD controller.

Except for the differences described in greater detail below, transceiver devices 12, 32 may be designed as CAN XL transceivers. Additionally or alternatively, transceiver devices 12, 32 may be designed as a conventional CAN FD transceiver. Transceiver device 22 may be designed as a conventional CAN transceiver or as a CAN FD transceiver.

A formation and then transfer of messages 45 having the CAN XL format, in addition to the reception of such messages 45, is achievable by use of the two user stations 10, 30.

FIG. 2 shows for message 45 a CAN XL frame 450, which is transmitted from transceiver device 12 or transceiver device 32. For the CAN communication on bus 40, CAN XL frame 450 is divided into different communication phases 451 through 455, namely, an arbitration phase 451, a first changeover phase 452 situated at the end of arbitration phase 451, a data phase 453, a second changeover phase 454 situated at the end of data phase 453, and a frame end phase 455.

In arbitration phase 451, for example at the start a bit is transmitted, which is also referred to as an SOF bit and which indicates the start of frame. An identifier including 11 bits, for example, for identifying the sender of message 45 is also transmitted in arbitration phase 451. During the arbitration, with the aid of the identifier, bitwise negotiation is carried out between user stations 10, 20, 30 concerning which user station 10, 20, 30 would like to transmit message 45, 46 having the highest priority, and therefore for the next time period for transmitting in changeover phase 452 and subsequent data phase 453, obtains exclusive access to bus 40 of bus system 1.

In the present exemplary embodiment, in first changeover phase 452 preparation is made for the changeover from arbitration phase 451 into data phase 453. Changeover phase 452 may include a bit AL1 that has bit duration T_B1 of a bit of arbitration phase 451, and that is transmitted with the physical layer of arbitration phase 451. The physical layer corresponds to the bit transmission layer or layer one of the conventional Open Systems Interconnection (OSI) model.

In data phase 453, after a DH1 bit and a DL1 bit, a data field identifier that is 8 bits long, for example, and that identifies the type of content in the data field may be initially transmitted. For example, the data field identifier may contain the value 9, which states, for example, that a data packet that is built up according to Internet Protocol version 4 (IPv4) is present in the data field. Following the data field identifier, for example a data length code that is 11 bits long may be sent, which may take on, for example, values from 1 to up to 2048, or some other value by an increment of 1. Alternatively, the data length code may include fewer or more bits, so that the value range and the increment may take on other values. The data length code is followed by further fields, for example the header check sum field. The useful data of CAN XL frame 450 or of message 45, also referred to as the data field of message 45, are subsequently sent. The useful data may include data, corresponding to the value range of the data length code, for example with a number of up to 2048 bytes or a larger number of bytes or some other arbitrary number of pieces of data. A check sum of the data of data phase 453 and of the data of arbitration phase 451 may be contained at the end of data phase 453, for example in a check sum field. The sender of message 45 may insert stuff bits as an inverse bit into the data stream in each case after a predetermined number of identical bits, in particular 10 identical bits. In particular, the check sum is a frame check sum F_CRC via which all bits of frame 450 up to the check sum field are verified. This may be followed by an FCP field having a predetermined value, for example 1100.

In the present exemplary embodiment, in second changeover phase 454 preparation is made for the changeover from data phase 453 into frame end phase 455. A piece of protocol format information that is contained in at least one bit and is suitable for implementing the changeover is sent. Changeover phase 454 may include a bit AH1 that has bit duration TB_1 of a bit of arbitration phase 451, but that is transmitted with the physical layer of data phase 453.

In frame end phase 455, after two bits AL2, AH2 at least one acknowledge bit ACK may be contained in an end field in frame end phase 455. This may be followed by a sequence of 7 identical bits that indicate the end of CAN XL frame 450. By use of the at least one acknowledge bit ACK, it may be communicated whether or not a receiver has found an error in received CAN XL frame 450 or message 45.

A physical layer, similarly as with CAN and CAN FD, is used at least in arbitration phase 451 and frame end phase 455. In addition, in first changeover phase 452 a physical layer, similarly as with CAN and CAN FD, may be used at least in part, i.e., at the start. Furthermore, in second changeover phase 454 a physical layer, similarly as with CAN and CAN FD, may be used at least in part, i.e., at the end.

An important point during phases 451, 455, at the start of phase 452 and at the end of phase 454, is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40.

The arbitration at the start of a frame 450 or of message 45, 46, and the acknowledgement in frame end phase 455 of frame 450 or of message 45, 46, are possible only when the bit time is much more than twice as long as the signal propagation time between two arbitrary user stations 10, 20, 30 of bus system 1.

Therefore, the bit rate in arbitration phase 451, frame end phase 455, and at least partially in changeover phases 452, 454, is selected to be slower than in data phase 453 of frame 450. In particular, the bit rate in phases 451, 452, 454, 455 is selected as 500 kbit/s, resulting in a bit time of approximately 2 µs, whereas the bit rate in data phase 453 is selected as 5 to 10 Mbit/s or greater, resulting in a bit time of approximately 0.1 µs and shorter. The bit time of the signal in the other communication phases 451, 452, 454, 455 is thus greater than the bit time of the signal in data phase 453 by at least a factor of 10.

A sender of message 45, for example user station 10, starts a transmission of bits of changeover phase 452 and of subsequent data phase 453 onto bus 40 only after user station 10, as the sender, has won the arbitration, and user station 10, as the sender, thus has exclusive access to bus 40 of bus system 1 for sending. The sender may either switch to the faster bit rate and/or the other physical layer after a portion of changeover phase 452, or may switch to the faster bit rate and/or the other physical layer only with the first bit, i.e., at the start, of subsequent data phase 453.

In general, in the bus system with CAN XL, in comparison to CAN or CAN FD in particular the following differing properties may be achieved:
 a) acquiring and optionally adapting proven properties that are responsible for the robustness and user-friendliness of CAN and CAN FD, in particular a frame structure including identifier and arbitration according to the CSMA/CR method,
 b) increasing the net data transfer rate to approximately 10 megabits per second, and
 c) increasing the quantity of the useful data per frame to approximately 2 kbytes or some other arbitrary value.

FIG. 3 shows the basic design of user station 10 together with communication control device 11, transceiver device 12, and changeover feedback block 15. User station 30 has a similar design, as shown in FIG. 3, except that block 35 is provided separately from communication control device 31 and transceiver device 32. Therefore, user station 30 and block 35 are not separately described. The functions of changeover feedback block 15 described below are present in an identical form for changeover feedback block 35.

According to FIG. 3, communication control device 11 also includes a communication control module 111, a transmission signal output driver 112, and an RxD terminal configuration module 113. Communication control device 11 is designed as a microcontroller or includes a microcontroller. Communication control device 11 processes signals of an arbitrary application, for example a control unit for a motor, a safety system for a machine or a vehicle, or other applications.

However, FIG. 3 does not show a system application-specific integrated circuit (ASIC), which alternatively may be a system base chip (SBC) on which multiple functions necessary for an electronics assembly of user station 10 are combined. Among other things, transceiver device 12 and an energy supply device (not illustrated) that supplies transceiver device 12 with electrical energy may be installed in the system ASIC. The energy supply device generally supplies a voltage CAN_Supply of 5 V. However, depending on the requirements, the energy supply device may supply some other voltage having a different value and/or may be designed as a power source.

According to FIG. 3, transceiver device 12 also includes a transmission module 121, a reception module 122, a driver 123 for transmission signal TxD, a reception signal output driver 124, a driver 125 that outputs a signal RxD_TC to changeover block 126, and a changeover block 126. Changeover block 126 forms from signal RxD_TC, signal TxD, and a signal S_SW, which is the output signal of reception module 122, an operating state switching signal S_OP for switching transmission module 121. In addition, changeover block 126 forms from signal RxD_TC and signals TxD, S_SW an operating state switching signal S_OPT for switching reception thresholds of reception module 122. Changeover block 126 recognizes that signaling from communication control module 111 is present in that changeover block 126 compares signal RxD_TC and signal S_SW, since signal RxD_TC contains at least one pulse according to a signal RxD_K that is sent from communication control module 111. This is described in greater detail below with reference to FIGS. 4 through 12.

Transmission module 121 from FIG. 3 is also referred to as a transmitter. Reception module 122 is also referred to as a receiver. The use of signal TxD in changeover block 126 is optional, as also shown in FIG. 3 by the dashed line at signal TxD. Signal RxD and signal RxD_TC have identical signal patterns, the two signals being separated by a driver 125.

Changeover block 126 may be designed as a switching block which in particular includes at least one flip-flop.

Changeover feedback block 15 includes an operating mode detection module 151 and an operating mode feedback module 152, whose functions are described in greater detail below.

Even though transceiver device 12 is consistently referred to below, it is alternatively possible to provide reception module 122 in a separate device externally from transmission module 121. Transmission module 121 and reception module 122 may be designed as a conventional transceiver device 22. Transmission module 121 may in particular include at least one operational amplifier and/or one transistor. Reception module 122 may in particular include at least one operational amplifier and/or one transistor.

As shown in FIG. 3, transceiver device 12 is connected to bus 40, or more precisely, to its first bus wire 41 for CAN_H and its second bus wire 42 for CAN_L. In transceiver device 12, first and second bus wires 41, 42 are connected to transmission module 121 and to reception module 122. The supplying of voltage for the energy supply device for supplying first and second bus wires 41, 42 with electrical energy takes place in a customary manner. In addition, the connection to ground or CAN_GND is achieved in a customary manner. The same applies for the termination of first and second bus wires 41, 42 via a terminating resistor.

During operation of bus system 1, transmission module 121 converts a transmission signal TxD of communication control device 11 into corresponding signals CAN_H and CAN_L for bus wires 41, 42 when user station 10 acts as a sender, and transmits these signals CAN_H and CAN_L onto bus 40. Even though signals CAN_H and CAN_L are stated here for transceiver device 12, with regard to message 45 they are to be understood as signals CAN XL_H and CAN XL_L, which in data phase 453 differ from conventional signals CAN_H and CAN_L in at least one feature, in particular with regard to the formation of the bus states for the various data states of signal TxD and/or with regard to the voltage or the physical layer and/or the bit rate.

A difference signal VDIFF=CAN_H−CAN_L is formed on bus 40 as a result of the signals. With the exception of an idle or standby state, transceiver device 12 with reception module 122 during normal operation always listens to a transfer of data or messages 45, 46 on bus 40, in particular regardless of whether or not user station 10 is the sender of message 45. Reception module 122 forms a signal S_SW and passes it on to communication control device 11 as a digital reception signal RxD via reception signal output driver 124, as shown in FIG. 3.

At the end of arbitration phase 451, it is clear which of user stations 10, 30 in subsequent data phase 453 acts as a sender, and which acts only as a receiver. In the present example, user station 10 acts as a sender and also as a receiver, while user station 30 acts only as a receiver. However, user station 30 may of course alternatively be the sender.

Changeover block 126 is designed to recognize, in a received message 45 from bus 40, the start of particular changeover phases 452, 454 and then, depending on the function of user station 10 in the subsequent communication phase, to change over the properties of transceiver device 12. Changeover block 126 may change over between the following operating modes of transceiver device 12:

a) first operating mode: Z_SL=transmit/receive properties for arbitration phase 451,
  transmission module 121 in transceiver device 12 generates dominant and recessive states on bus 40,
  reception module 122 operates with a reception threshold T_a of typically approximately 0.7 V. In addition, reception module 122, in particular for integration of user station 10 into an ongoing communication at bus 40, may operate with a negative reception threshold.
b) second operating mode: transmit/receive properties for data phase 453 as a receiver (reception node),
  transmission module 121 in transceiver device 12 generates recessive states or is optionally switched off after changeover phase 452, since transceiver device 12 is not a sender, and acts only as a receiver of message 45 or of a frame 450,
  reception module 122 operates with a reception threshold T_d of typically approximately 0.0 V.
c) third operating mode: transmit/receive properties for data phase 453 as a sender (transmission node),
  transmission module 121 in transceiver device 12 drives a 0 state or a 1 state as a function of the TxD signal, since transceiver device 12 acts as a sender of message 45 or of a frame 450,
  reception module 122 operates with a reception threshold T_d of typically approximately 0.0 V.

RxD terminal configuration module 113 of communication control device 11 configures terminal RxD according to the necessary communication direction, using signals S1, S2 at the input of module 113, as described below. Signal S1 may be referred to as RxD_out_ena, which allows no driving of additional signal RxD_TC via the RxD terminal (first terminal operating mode), or allows driving of additional signal RxD_TC via the RxD terminal (second terminal operating mode). Signal S2 may be referred to as RxD_out_val. Depending on the value of signal S2, communication control device 11 drives terminal RxD at the changeover points in time between the two different communication phases for signaling to transceiver device 12 the operating mode to be set, i.e., on the one hand in first changeover phase 452 for changing over between arbitration phase 451 and data phase 453, and on the other hand, in second changeover phase 454 for changing over between data phase 453 and frame end phase 455. Depending on the value of signal S2, communication control device 11 may optionally drive terminal RxD in a third terminal operating mode, also referred to as "talk mode," in which an internal communication between devices 11, 12 is possible. Otherwise, as is customary with CAN, terminal RxD is an input, i.e., not an output, for communication control device 11, as described above, so that communication control device 11 does not drive terminal RxD. Terminal RxD may thus be operated bidirectionally with the aid of RxD terminal configuration module 113 and signals S1, S2. In other words, terminal RxD is a bidirectional terminal.

For this purpose, communication control device 11 and output driver 124 are designed in such a way that during driving for the purpose of signaling, communication control device 11 drives terminal RxD more strongly than output driver 124. This avoids the situation that the value of the RxD line could be uncertain if both communication control device 11 and output driver 124 drive terminal RxD, resulting in a superimposition of the two signal sources at terminal RxD. In the event of such a superimposition of the two signal sources at terminal RxD, communication control device 11 always prevails. The value of the RxD line is thus always certain.

Changeover block 126 may thus provide the option to set in transceiver device 12 one of the at least three operating modes mentioned above, which are signaled via the RxD terminal and TxD terminal. An additional terminal in the form of another pin at transceiver device 12, and thus also at communication control device 11, is not necessary for this purpose.

For this purpose, according to FIG. 3, changeover block 126 is provided with at least two inputs via which a signal RxD_TC, signal SSW, and optionally signal TxD are fed into changeover block 126. Signal RxD_TC is based on a signal that is sent from communication control device 11, via the terminal for the RxD signal, to transceiver device 12. With signal RxD_TC, communication control device 11 signals to transceiver device 12 at least that transceiver device 12 is now to make the changeover into the appropriate operating mode for data phase 453. In addition, with signal RxD_TC and/or signal TxD, communication control device 11 signals to transceiver device 12 into which of operating modes Z_F_RX, Z_F_TX the changeover is to be made. This is helpful in particular for the changeover from arbitration phase 451 to data phase 453. At the end of data phase 453, communication control device 11 with signal RxD_TC may carry out the signaling for the changeover of transceiver device 12 from each of the two operating modes of data phase 453 into operating mode Z_SL for arbitration phase 451. Furthermore, with signal RxD_TC, arbitrary other pieces of information may be sent from communication control device 11 to transceiver device 12, as mentioned above.

According to FIG. 3, transceiver device 12 leads signal RxD_TC from terminal RxD, via driver 125, to the terminal of changeover block 126 for signal RxD_TC. In contrast, signal S_SW is generated from the signal received from bus 40. Signal RxD_TC is led between the terminal for the RxD signal and the output of reception signal driver 124 to changeover block 126. Signal S_SW is led from the output of reception module 122 and, upstream from the input of reception signal driver 124, to changeover block 126.

If changeover block 126 recognizes changeover phase 452, the operating state of transmission module 121 and/or of reception module 122, and thus the operating mode of transceiver device 12, are switched via signals S_OP, S_OPT that are output from changeover block 126.

At changeover feedback block 15, based on the output signals of transmission module 121 and of reception module 122, operating mode detection module 151 detects which operating mode Z_SL, Z_F_RX, Z_F_ZX transmission module 121 and reception module 122 are switched into. In particular, operating mode detection module 151 is designed as a comparator. Operating mode detection module 151 passes on the detection result as a status signal S_E to operating mode feedback module 152. Operating mode feedback module 152 also receives a status signal S_B from changeover block 126. Status signal S_B indicates whether a signaling of the changeover condition has been recognized. Optionally, status signal S_B additionally indicates which operating mode is to be switched into. With the aid of these status signals S_E, S_B, operating mode feedback module 152 decides whether operating mode feedback module 152, via an RxD signal, must provide feedback to communication control device 11, and when the feedback must be sent.

If the feedback is positive, i.e., transceiver device 12 has recognized the signaling and has changed over the operating mode as requested, operating mode feedback module 152 then changes or manipulates the RxD signal in such a way that communication control device 11 obtains the feedback via the RxD signal.

Transceiver devices 12, 32 have at least three different options for carrying out the feedback via an RxD signal. This is described in greater detail below with reference to FIGS. 4 through 12. It is assumed that user station 10 acts as a sender (transmission node) for data phase 453, and user station 30 acts only as a receiver (reception node) for data phase 453.

Figure 4:
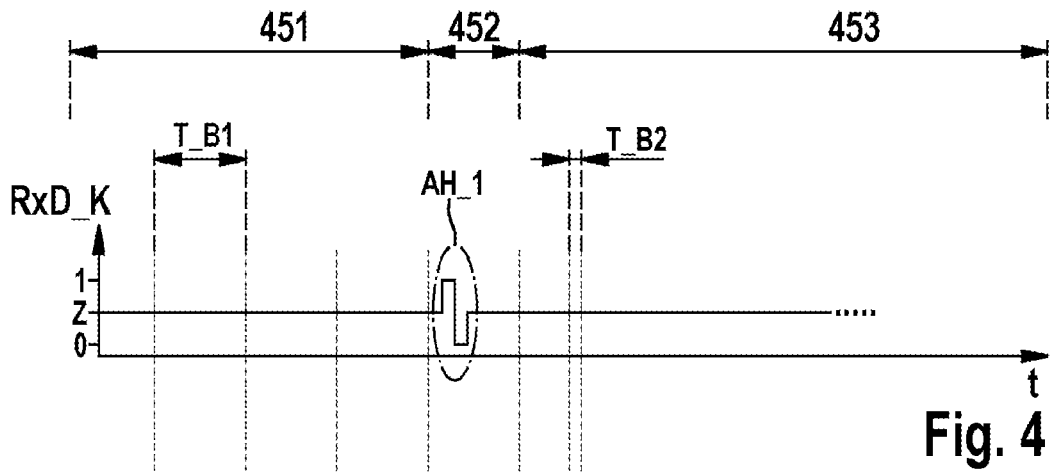
FIGS. 4 through 6 show an example of signals in the first exemplary embodiment with regard to feedback of an operating mode changeover of the transceiver device in a user station that acts only as a receiver during a second communication phase (data phase).
Figure 5:
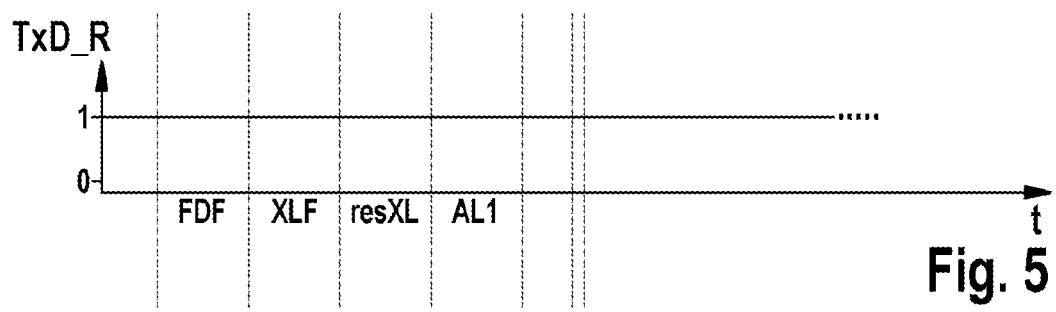
Figure 6:
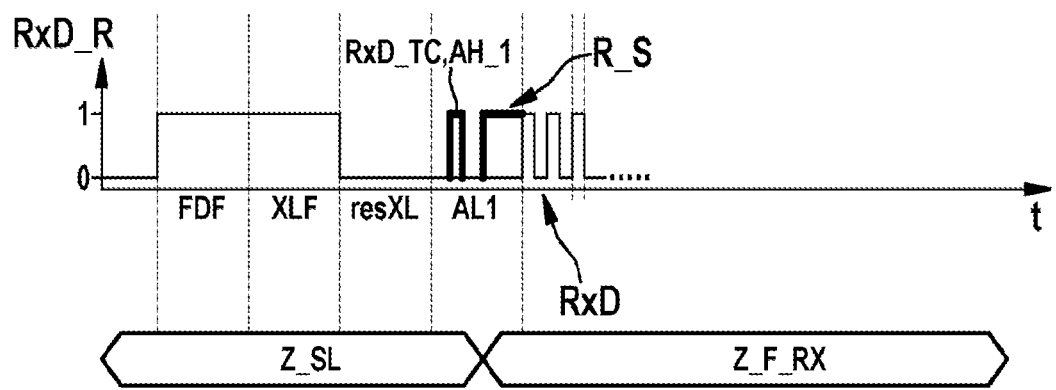

FIGS. 4 through 6 show an example of signals before, during, and after changeover phase 452 for user station 30 (transmission node). At the transition from arbitration phase 451 to data phase 453, in changeover phase 452 a changeover is made from a bit duration T_B1 of arbitration phase 451 to a smaller or shorter bit duration T_B2 of data phase 453. Operating mode Z_SL of transceiver device 32 is changed over into operating mode Z_F_RX of transceiver device 32.

To this end, FIG. 4 shows an example of an RxD_K signal that is driven by communication control device 31 for the changeover of the operating mode of transceiver device 32, in each case for states 0, Z, 1. State Z stands for the high-impedance state. FIG. 5 shows a portion of transmission signal TxD_R, which for example is provided by communication control device 31 for transceiver device 32. FIG. 6 shows a signal RxD_R that is driven from transceiver device 32 to communication control device 31. Signal RxD_R is made up of the digital signal, which has been generated from signal S_SW, and the signal which the operating mode feedback module, which corresponds to module 152, outputs to transceiver device 32. In addition, signal RxD_R also includes the signaling with the aid of signal RxD_K; signal RxD_K overwrites signal RxD_R, as indicated in FIG. 6 as pulse RxD_TC,AH_1.

As shown in FIGS. 4 through 6, prior to changeover phase 452, in transmission signal TxD_R communication control device 31 sends in each case a state high (first binary signal state), so that transmission signal TxD_R does not overwrite the signal states on bus 40, which according to signal RxD_R from FIG. 6 are an FDF bit and an XLF bit in succession, each with the state high (first binary signal state), and then a resXL bit and an AL1 bit, each with the state low (second binary signal state). Alternatively, operating mode changeover block 126 is designed to switch off transmission module 121 in second operating mode Z_F_RX.

At the end of arbitration phase 451, based on signal RxD_K from FIG. 4 a changeover is made from the bits of arbitration phase 451 with bit time T_B1 to the shorter bits of data phase 453 with bit time T_B2, as shown in FIGS. 4 through 6. For this purpose, RxD_K or resulting signal RxD_TC includes at least one pulse or a pulse pattern AH_1 in the AL1 bit. The duration of a pulse of pulse pattern AH_1 from FIG. 4 is smaller or greater than bit time T_B2. The duration of a pulse of pulse pattern AH_1 from FIG. 4 is smaller or shorter than bit time T_B1. The AL1 bit is followed by the data of data phase 453.

According to FIGS. 4 through 6, feedback R_S takes place using module 152 after the RXD signaling with at least one pulse or pulse pattern AH_1 of signal RxD_K or RxD_TC in the AL1 bit, and after the actual changeover of the operating mode of transceiver device 32 has taken place. The changeover into second operating mode Z_F_RX means that transceiver device 32 changes over its reception threshold T_a in its reception module 122 into reception threshold T_d. The signal pattern of signal RxD_R without feedback R_S from transceiver device 32 is depicted in FIG. 6 by solid lines. The signal pattern of feedback R_S from transceiver device 32 is depicted in FIG. 6 by boldface lines.

In the example from FIG. 6, as feedback R_S, transceiver device 32 inserts into the signal pattern of signal RxD_R an inverse pulse that lasts at bus 40 up to one of the subsequent edge changes. In FIG. 6, feedback R_S lasts up to the next rising edge in the digital signal, which has been generated from signal S_SW. In particular, the inverse pulse has an absolute duration of 400 ns, for example. Of course, some other duration of the inverse pulse of signal RxD_R is possible.

If communication control device 31, more precisely, its module 111, samples the AL1 bit in reception signal RxD_R for a sampling point of typically 80%, for example, and sees a logical "1", the changeover in transceiver device 32 has been correctly carried out. If communication control device 31, more precisely, its module 111, sees a logical "0", then the changeover in transceiver device 32 has not been correctly carried out.

If the changeover has not worked and feedback R_S is absent, an error is present. For example, transceiver device 32 remains in the operating mode for the first communication phase (longer bit durations), although for the second communication phase (shorter bit durations) it should have changed into operating mode Z_F_RX. There is a high likelihood that communication control device 31 will now find bit errors in the bit stream of signal RxD via the second terminal due to the fact that the reception threshold in reception module 122 has not changed over to T_d. If communication control device 31 sees bit errors in the bit stream of signal RxD via the second terminal, during the subsequent error processing, communication control device 31 does not have to switch transceiver device 32 into operating mode Z_SL for the first communication phase (longer bit durations), since transceiver device 32 is already in this operating mode.

If the changeover of the operating mode in transceiver device 32 has worked and this has been correctly signaled with the aid of the signal pattern of feedback R_S, communication control device 31 knows that transceiver device 32 is in operating mode Z_F_RX. If communication control device 31 finds a bit error in the bit stream of signal RxD via the second terminal, during the subsequent error processing, communication control device 31 must be able to intentionally change over transceiver device 32 from an operating mode of the second communication phase (longer bit duration) into an operating mode of the first communication phase (shorter bit duration), in particular with a pulse on the TXD signal. Therefore, it is not necessary to wait for the long-duration "timeouts" in transceiver device 32, which likewise switch the operating mode back to the operating mode of the first communication phase. As a result, transceiver device 32 (reception node), despite reception errors, is able to recognize the idle condition of 11 recessive bits at the end of a sent frame 450, and is thus able to re-integrate very quickly back into the communication on bus 40.

In addition, it is optionally possible for user station 30 to send an error frame in order to abort the transfer of frame 450 or message 45. The transfer using incorrectly set bus components may thus be discontinued as quickly as possible. This increases the net data rate that is transferable in bus system 1, and the communication in bus system 1 becomes more robust.

Figure 7:
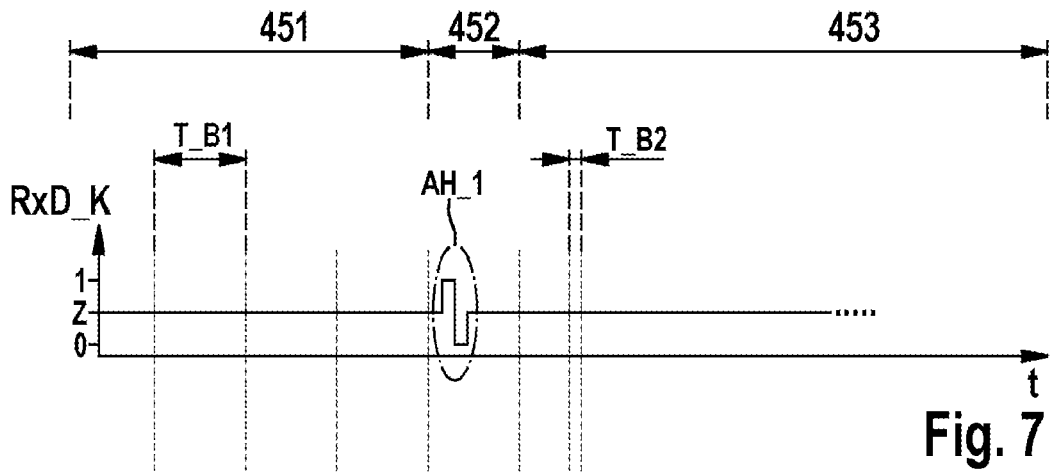
FIGS. 7 through 9 show an example of signals in the first exemplary embodiment with regard to feedback of an operating mode changeover of the transceiver device in a user station that acts as a sender during a second communication phase (data phase).
Figure 8:
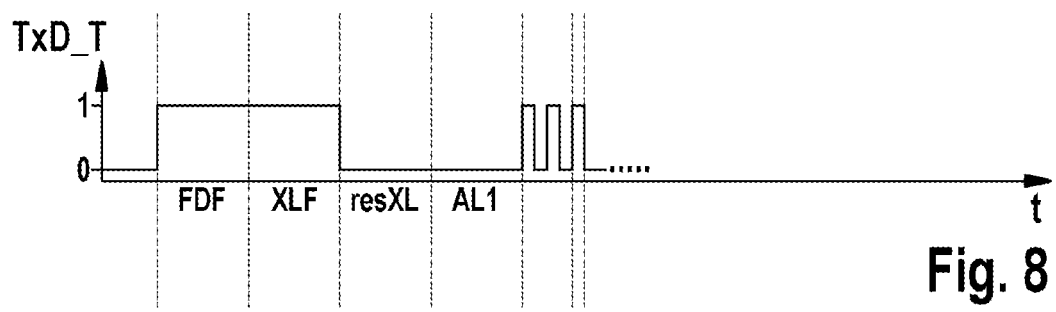
Figure 9:
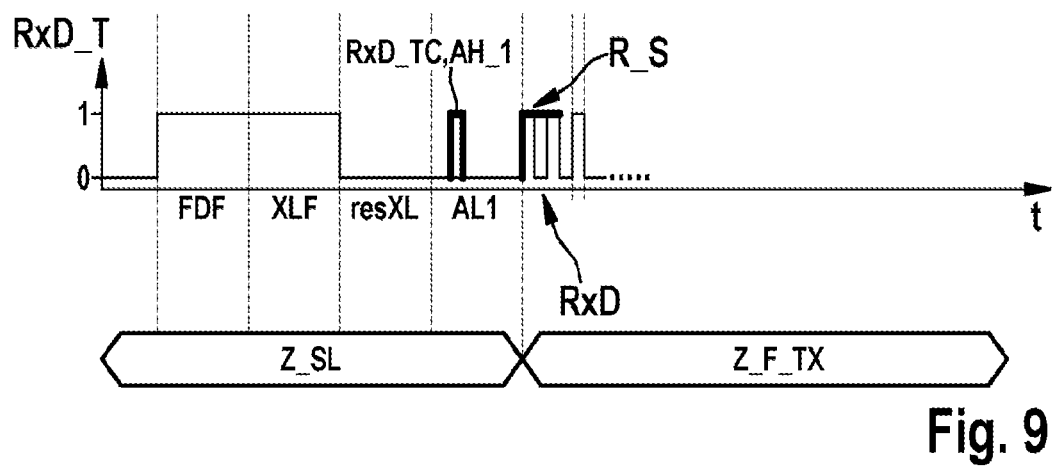

FIGS. 7 through 9 show an example of feedback R_S in user station 10 (transmission node) during the changeover in transceiver device 12 from operating mode Z_SL to third operating mode Z_F_TX. Except for the following differences, the description above with reference to FIGS. 4 through 6 applies.

FIG. 7 shows an example of an RxD_K signal that is driven by communication control device 11 for the changeover of the operating mode of transceiver device 12, in each case for states 0,Z, 1. FIG. 8 shows a portion of transmission signal TxD_T, which for example is provided by communication control device 11 for transceiver device 12. FIG. 9 shows a signal RxD_T which, after receipt of transmission signal TxD_T at the terminal for reception module 122, is driven by transceiver device 12 to communication control device 11. Signal RxD_T is made up of the digital signal that has been generated from signal S_SW, and the signal that operating mode feedback module 152 outputs to transceiver device 12. In addition, signal RxD_T also includes the signaling with the aid of signal RxD_K; signal RxD_K overwrites signal RxD_R, as indicated in FIG. 9 as pulse RxD_TC,AH_1.

As shown in FIGS. 7 through 9, prior to changeover phase 452, communication control device 11 sends in transmission signal TxD_T the FDF bit and an XLF bit in succession, each with the state high (first binary signal state). This is followed by a resXL bit, which is sent with the state low (second binary signal state) and followed by an AL1 bit, which is likewise sent with the state low (second binary signal state).

According to FIGS. 7 through 9, feedback R_S takes place after the actual changeover of the operating mode of transceiver device 12. More precisely, feedback R_S takes place during the change into third operating mode Z_F_TX, after the end of the AL1 bit. The signal pattern of digital reception signal RxD_T without feedback from transceiver device 12 is depicted in FIG. 9 by solid lines. The signal pattern of feedback R_S from transceiver device 12 is depicted in FIG. 9 by boldface lines.

In the example from FIG. 9, as feedback R_S, transceiver device 12 likewise inserts into the signal pattern of signal RxD_T an inverse pulse that is made up in such a way that a pulse at the S_SW signal is filtered out. The pulse length is determined by the two edge changes in the S_SW signal. In other words, operating mode feedback module 152 inserts the pulse as feedback R_S in such a way that the pulse in digital reception signal RxD_T overwrites a value that has an arbitrary length or duration and is the inverse of the value of the pulse. The edges in reception signal RxD_T limit the duration of the value of the pulse. As a result, digital reception signal RxD_T is changed; i.e., operating mode feedback module 152 filters out the next 0 pulse from the RxD bit stream at the second terminal. Alternatively, the next 1 pulse could also be filtered out from the RxD bit stream at the second terminal. Alternatively, more than one pulse may be filtered out.

Transceiver device 12 filters out the first 0 pulse, regardless of its length, in digital reception signal RxD_T after the changeover, i.e., the first 0 pulse after the end of the AL1 bit. Communication control device 11 notices this manipulation or change of digital reception signal RxD_T during sampling of the bits of signal RxD_T. This delayed feedback R_S is sufficient, since communication control device 11, in particular its module 111, does not abort the sending of message 45 and it is possible to respond to an error even a couple of bits later.

Depending on what is indicated by feedback R_S of the changeover, communication control device 11 may follow the procedure as stated above with regard to communication control device 31.

Figure 10:
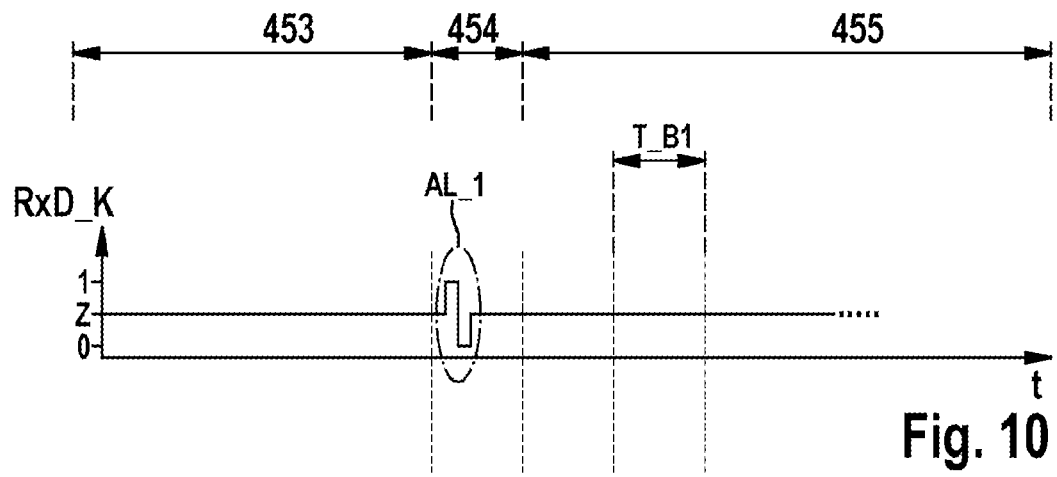
FIGS. 10 through 12 show an example of signals in the first exemplary embodiment with regard to feedback of an operating mode changeover of the transceiver device in a user station, which after the second communication phase (data phase) is changed over into the operating mode for the first communication phase (arbitration phase).
Figure 11:
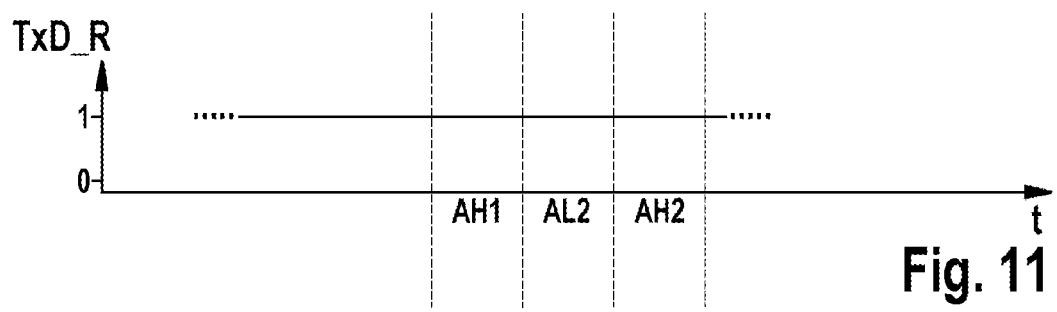
Figure 12:
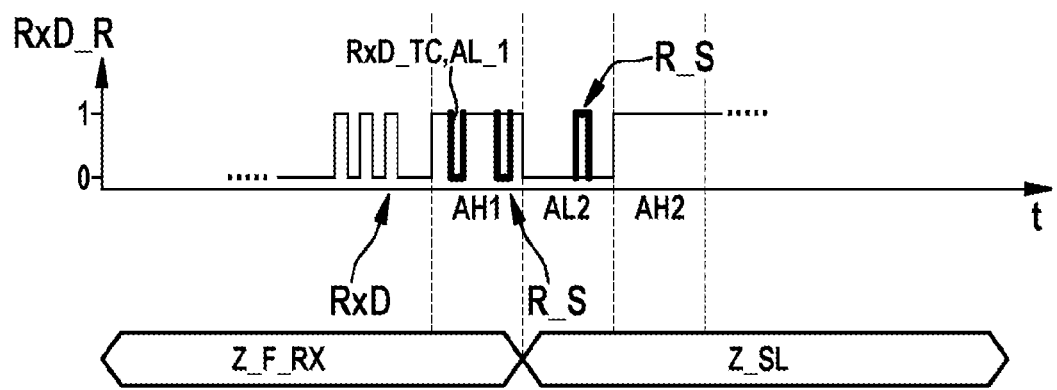

FIG. 10 through FIG. 12 show an example of feedback R_S in user station 30 (reception node) during the changeover in transceiver device 32 from second operating mode Z_F_RX to first operating mode Z_SL. This changeover thus takes place after data phase 453.

FIG. 10 shows an example of an RxD_K signal that is driven by communication control device 11 for the changeover of the operating mode of transceiver device 32, in each case for states 0, Z, 1. FIG. 11 shows a portion of transmission signal TxD_R, which for example is provided by communication control device 11 for transceiver device 32, as described above with reference to FIG. 5. However, an AH1 bit with the state high (first binary signal state) in changeover phase 454, and then in frame end phase 455, an AL2 bit with the state low (second binary signal state) and an AH2 bit with the state high (first binary signal state), are now sent via bus 40. These are followed by the other bits of frame end phase 455. FIG. 12 shows a signal RxD_R that is driven from transceiver device 32 to communication control device 31, as described above with reference to FIG. 6. In FIG. 12, signal RxD_R also includes the signaling with the aid of signal RxD_K; signal RxD_K overwrites signal RxD_R, as indicated in FIG. 12 as pulse RxD_TC,AH_1 and explained above with reference to FIG. 6.

FIG. 12 shows two options for feedback R_S. Thus, feedback R_S may take place prior to the actual changeover of the operating mode of transceiver device 32, as shown via the pulse with a boldface line in the AH1 bit as feedback R_S. Alternatively, feedback R_S may take place after the actual changeover of the operating mode of transceiver device 32, as shown via the pulse with a boldface line in the AL2 bit as feedback R_S. The changeover of the operating mode takes place at the end of the AH1 bit. The signal pattern of digital reception signal RxD_R without feedback from transceiver device 32 is depicted in FIG. 12 by solid lines.

In the example from FIG. 12, as feedback R_S, transceiver device 32 inserts an inverse pulse of 200 ns, for example, into the signal pattern of signal RxD_R. Of course, some other duration of the pulse of feedback R_S is selectable.

Feedback R_S in the AL2 bit according to FIG. 12 is more advantageous than feedback R_S in the AH1 bit according to FIG. 12, since feedback R_S in the AL2 bit does not interfere with the synchronization of user stations 10, 30 at the edge between the AH1 bit and the AL2 bit.

The same feedback is also possible in user station 10 (transmission node) when transceiver device 32 switches from operating mode Z_F_TX into operating mode Z_SL.

As a result of the design of user station 10 described above, a galvanic connection via an additional terminal in each case at communication control device 11 and transceiver device 12 connected thereto is not necessary in order for communication control device 11 to be able to transfer the point in time of the operating mode changeover and receive feedback R_S. This means that block 15 advantageously does not require an additional terminal, which is not available at a standard housing of transceiver device 12. Changing to another housing that is larger and expensive in order to provide an additional terminal is thus not necessary due to block 15.

In addition, block 15 makes it possible for transceiver device 12 to not require a protocol controller functionality. Such a protocol controller could, among other things, recognize changeover phase 452 of message 45 and initiate data phase 453 as a function thereof. However, since such an additional protocol controller would require considerable surface area in transceiver device 12 or the ASIC, block 15 results in a great reduction in the resource requirements.

As a result, the interconnection of operating mode changeover block 126 and block 15 with a customary transceiver device provides a very simple and cost-effective approach to indicate to transceiver device 12 that a changeover, and which changeover between its various operating modes, is to be made, namely, in particular from the first operating mode into the second operating mode or from the first operating mode into the third operating mode or from the second operating mode into the first operating mode or some other changeover of operating modes. In addition, block 15 may also provide communication control device 12 [sic; 11] with appropriate feedback R_S regarding the changeover in a very simple, cost-effective, and robust manner.

Due to the described design of transceiver device(s) 12, 32, much higher data rates may be achieved in data phase 452 [sic];
than with CAN or CAN FD. In addition, the data length in the data field of data phase 453 may be arbitrarily selected, as described above. As a result, the advantages of CAN with regard to the arbitration may be maintained, yet a higher volume of data may be transferred very reliably and thus effectively, in a shorter time period than previously, i.e., without the need for repeating the data on account of an error, as explained below.

A further advantage is that error frames are not needed in bus system 1 for the transfer of messages 45, but may be optionally used. If no error frames are used, messages 45 are no longer destroyed, which eliminates the need for a duplicate transfer of messages, thus increasing the net data rate.

If the bus system is not a CAN bus system, operating mode changeover block 126 may be designed to respond to other changeover signals. The same applies for block 15. In this case, operating mode changeover block 126 may switch transmission module 121 and/or reception module 122 into one of at least two different operating modes based on a result of its evaluation, and after expiration of a duration T0 that is preset for operating mode changeover block 126, may change at least one of the operating modes over into another of the operating modes. Block 15 may in each case provide communication control device 11 with appropriate feedback R_S regarding the changeover.

According to a second exemplary embodiment, block 15, more precisely, its module 152, sends a pulse pattern to the RXD terminal. For example, if RXD=0 at that time, particular transceiver device 12, 32 may then transmit pulse pattern 010 to terminal RXD.

Alternatively, block 15, more precisely, its module 152, sends a pulse pattern to the RXD terminal with a time delay. For example, block 15, more precisely, its module 152, may send the pulse pattern to bus 40 only after the next edge.

Otherwise, bus system 1 in the second exemplary embodiment has the same design as described above with regard to the first exemplary embodiment.

According to a third exemplary embodiment, block 15, more precisely, its module 152, sends the signal to terminal RXD:="constant 0 or constant 1" up to a predetermined event.

The predetermined event may be a new signaling of the changeover from communication control device 11, 31 to associated transceiver device 12, 32. Alternatively, the predetermined event is a predetermined timeout in transceiver device 12, 32.

Thus, as long as transceiver device 12, 32 is in a predetermined state, "RXD=constant" applies for its RXD terminal. If transceiver device 12, 32 leaves the predetermined state, the RxD signal of transceiver device 12, 32 once again corresponds to the value on bus 40.

Thus, each of transceiver devices 12, 32 has at least three different options for carrying out feedback R_S using reception signal RxD, RxD_R, RxD_T. For this purpose, each of transceiver devices 12, 32 of associated communication control device 11, 31 provides a reception signal RxD, RxD_R, RxD_T, which does not reflect the state on bus 40 as is customary, but which instead is at least temporarily manipulated. Based on the manipulation, communication control device 11, 31, in particular its module 111, recognizes positive feedback R_S from associated transceiver device 12, 32.

All of the above-described embodiments of blocks 15, 35, of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 10BASE-TlS Ethernet, field bus systems, etc.

Above-described bus system 1 according to the exemplary embodiments is described with reference to a bus system based on the CAN protocol. However, bus system 1 according to the exemplary embodiments may also be some other type of communications network in which data are serially transferable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or more of user stations 10 or 30 to be present in bus system 1. It is possible for all user stations in bus system 1 to have the same design, i.e., for only user station 10 or only user station 30 to be present.

The type of signaling of the changeover of the operating mode to individual transceiver devices 12, 32 is arbitrarily selectable. Additionally or alternatively, the type of feedback R_S for each individual transceiver device 12, 32 is arbitrarily selectable. In addition, feedback R_S for the changeover from arbitration phase 451 into data phase 453 may be different from feedback R_S for the changeover from data phase 453 into arbitration phase 451. Arbitrary combinations of the above-described embodiment variants of feedback R_S are possible.

What is claimed is:

1. A transceiver device for a user station of a serial bus system, the transceiver device comprising:
   a first terminal configured to receive a transmission signal from a communication control device;
   a transmission module configured to transmit the transmission signal onto a bus of the bus system, in which bus system at least one first communication phase and one second communication phase are used for exchanging messages between user stations of the bus system;
   a reception module configured to receive a signal from the bus, the reception module being configured to generate a digital reception signal from the signal received from the bus;
   a second terminal configured to send the digital reception signal to the communication control device and to receive an operating mode changeover signal from the communication control device; and
   a changeover feedback block configured to output feedback regarding a changeover of an operating mode that has taken place as a result of the operating mode changeover signal, the changeover feedback block being configured to output the feedback to the communication control device via the second terminal and in the digital reception signal.

2. The transceiver device as recited in claim 1, wherein the changeover feedback block includes:
   an operating mode detection module configured to detect, based on output signals of the transmission module and of the reception module, which operating mode the transmission module and the reception module are switched into; and
   an operating mode feedback module configured to evaluate an operating mode status signal that is output by the operating mode detection module, and to evaluate a status signal of an operating mode changeover block that is configured to carry out the changeover of the operating mode based on the operating mode changeover signal.

3. The transceiver device as recited in claim 2, wherein the operating mode feedback module is configured to decide whether the operating mode feedback module must provide the feedback to the communication control device via the digital reception signal, and when the feedback must be sent.

4. The transceiver device as recited in claim 2, wherein:
   the operating mode feedback module is configured to insert the feedback into the digital reception signal after the changeover of the operating mode that has been signaled via the operating mode changeover signal, or
   the operating mode feedback module is configured to insert the feedback into the digital reception signal after the operating mode changeover signal, but before the changeover of the operating mode that has been signaled via the operating mode changeover signal.

5. The transceiver device as recited in claim 2, wherein the operating mode feedback module is configured to insert the feedback into the digital reception signal as at least one pulse having a value that is an inverse of a value of the digital reception, the pulse having a predetermined absolute duration or the pulse is configured in such a way that the pulse in the digital reception signal overwrites a value whose duration in the digital reception signal is limited by a distance between two arbitrary edges of the digital reception signal.

6. The transceiver device as recited in claim 5, wherein the at least one pulse lasts at the bus up to a subsequent edge change that follows in the digital reception signal.

7. The transceiver device as recited in claim 5, further comprising:
   an operating mode changeover block configured to evaluate the operating mode changeover signal that is received from the communication control device at the second terminal and to evaluate the transmission signal, the operating mode changeover block being configured to switch the transmission module and/or the reception module into one of at least three different operating modes based on a result of the evaluation.

8. The transceiver device as recited in claim 7, wherein the operating mode changeover signal received from the communication control device at the second terminal is a pulse having a value that is an inverse of a value of the digital reception signal, the operating mode changeover block being configured to switch the reception module from a first operating mode into a second operating mode when the changeover signal includes the pulse, and a value of the transmission signal corresponds to a value of the pulse, the operating mode changeover block being configured to switch the transmission module and the reception module from the first operating mode into a third operating mode when the changeover signal includes the pulse and the value of the transmission signal is an inverse of the value of the pulse, the transceiver device in the second operating mode not being a sender of a message in the second communication phase, and the transceiver device in the third operating mode being the sender of the message in the second communication phase.

9. The transceiver device as recited in claim 2, wherein the operating mode feedback module is configured to configure the feedback as manipulation of the digital reception signal in such a way that the digital reception signal has a constant value up to a predetermined event.

10. The transceiver device as recited in claim 9, wherein the predetermined event is: (i) a new signaling of the changeover of the operating mode, using the operating mode changeover signal, or (ii) a predetermined passage of time in the transceiver device.

11. The transceiver device as recited in claim 1, wherein the transmission module is configured to drive bits of the transmission signal onto the bus in the first communication phase with a first bit time that is longer by at least a factor of 10 than a second bit time of bits that are driven by the transmission module onto the bus in the second communication phase, wherein the operating mode changeover signal, via the second terminal for signaling that the changeover of the operating mode is to be made, includes: (i) at least one pulse with a duration that is shorter than the first bit time and longer than the second bit time, or (ii) at least one pulse with a pulse duration that is approximately equal to the second bit time or shorter than the second bit time, and wherein the feedback via the second terminal for signaling that the operating mode has been changed over includes: (i) at least one pulse with a duration that is shorter than the first bit time and longer than the second bit time, or (ii) at least one pulse with a pulse duration that is approximately equal to the second bit time or shorter than the second bit time.

12. The transceiver device as recited in claim 1, wherein the signal received from the bus in the first communication phase is generated with a different physical layer than the signal received from the bus in the second communication phase.

13. The transceiver device as recited in claim 1, wherein in the first communication phase, it is negotiated which of the user stations of the bus system in a subsequent second communication phase obtains, at least temporarily, exclusive, collision-free access to the bus.

14. A communication control device for a user station of a serial bus system, comprising:
a communication control module configured to generate a transmission signal for controlling a communication of the user station with at least one other user station of the bus system, in which bus system at least one first communication phase and one second communication phase are used for exchanging messages between user stations of the bus system;
a first terminal configured to send the transmission signal to a transceiver device which is configured to transmit the transmission signal onto a bus of the bus system; and
a second terminal configured to receive a digital reception signal from the transceiver device;
wherein the communication control device is configured to generate an additional signal that indicates to the transceiver device that a switch is to be made from a present operating mode into another operating mode of at least three different operating modes, and that achieves an internal communication between the communication control module and the transceiver device, and the communication control module is configured to send the additional signal, in the digital reception signal, to the transceiver device via the second terminal, and to receive, via the second terminal, feedback in the digital reception signal from the transceiver device regarding a changeover of the operating mode that has taken place as a result of the additional signal, and to evaluate the feedback.

15. A bus system, comprising:
a bus; and
at least two user stations that are connected to one another via the bus in such a way that they may communicate serially with one another, and of which at least one of the user stations includes:
a communication control device,
a first terminal configured to receive a transmission signal from the communication control device,
a transmission module configured to transmit the transmission signal onto a bus of the bus system, in which bus system at least one first communication phase and one second communication phase are used for exchanging messages between user stations of the bus system,
a reception module configured to receive a signal from the bus, the reception module being configured to generate a digital reception signal from the signal received from the bus,
a second terminal configured to send the digital reception signal to the communication control device and to receive an operating mode changeover signal from the communication control device, and
a changeover feedback block configured to output feedback regarding a changeover of an operating mode that has taken place as a result of the operating mode changeover signal, the changeover feedback block being configured to output the feedback to the communication control device via the second terminal and in the digital reception signal.

16. A method for communicating in a serial bus system, the method being carried out using a transceiver device for a user station of a bus system, in which at least one first communication phase and one second communication phase are used for exchanging messages between user stations of the bus system, each user station including a transmission module, a reception module, a changeover feedback block, a first terminal, and a second terminal, and the method comprising the following steps:
receiving, via the reception module, a signal from the bus of the bus system;
generating, via the reception module, a digital reception signal from the signal received from the bus and outputting the digital reception signal to the second terminal; and
outputting, via the changeover feedback block, feedback regarding a changeover of an operating mode that has taken place based on an operating mode changeover signal, the changeover feedback block outputting the feedback to the communication control device via the second terminal and in the digital reception signal.

\* \* \* \* \*